(12) United States Patent
Lee et al.

(10) Patent No.: US 7,208,942 B2
(45) Date of Patent: Apr. 24, 2007

(54) MAGNETISM METRIC CONTROLLER

(75) Inventors: Wen-Chin Lee, Taipei (TW); Shang-Hao Chen, Taipei (TW)

(73) Assignees: Gimbal Technology Co., Ltd., Taipei (TW); Sunrex Technology Corp., Taichung Hsien (TW)

( * ) Notice: Subject to any disclaimer, the term of this patent is extended or adjusted under 35 U.S.C. 154(b) by 231 days.

(21) Appl. No.: 10/991,370

(22) Filed: Nov. 19, 2004

(65) Prior Publication Data

US 2006/0108999 A1  May 25, 2006

(51) Int. Cl.
*G01B 7/30* (2006.01)
*G09G 5/08* (2006.01)

(52) U.S. Cl. ................. 324/207.25; 345/157; 345/163; 345/164; 345/184

(58) Field of Classification Search ...............
324/207.23–207.25, 207.2, 252; 345/161, 345/163–164, 156, 157, 184
See application file for complete search history.

(56) References Cited

U.S. PATENT DOCUMENTS 6,505,088 B1 *   1/2003   Simkin et al. ................ 700/85
6,611,139 B1 *   8/2003   Jackson ................... 324/207.2

* cited by examiner

*Primary Examiner*—Reena Aurora
(74) *Attorney, Agent, or Firm*—Leong C. Lei

(57) ABSTRACT

A precise, consistent, reliable, and high resolution magnetism metric controller applied in electronic and information devices is comprised of a scrolling wheel mechanism to drive by rotation a permanent magnet to retrieve signals of changed magnetic field due to displacement of magnetic poles of the permanent magnet.

2 Claims, 5 Drawing Sheets

MAGNETISM METRIC CONTROLLER

BACKGROUND OF THE INVENTION (a) Technical Field of the Invention

The present invention is related to a magnetism controller, and more particularly, to one retrieves signals of changed magnetic filed created by displacement of a permanent magnet driven by rotation.

(b) Description of the Prior Art

Many peripherals including keyboard, mechanical roller mouse and up to present optical mouse or wireless mouse for the control and movement of cursor on screen in computer system have been consecutively introduced with their primary purposes of include cursor movement control, page scrolling and click control.

Whereas users were not satisfied with the slow and inconvenient use of the keyboard at the beginning in providing functions of an indicator, the mouse was invented. Up to now, mouse remains the most favored indicator to computer users. However, indicators either in earlier or current types are found with many limitations and defectives, such as:

1. Shorter service life. The scrolling metric control relates to mechanical movement since the achievement of scrolling metric control of the prior art relies upon a switch encoder.

2. Malfunction. Though the grating sensor is used for the rotation metric control of the latest indicator for longer service and more comfortable operation feel; the design on grating theories is vulnerable to inconsistent control.

3. Insufficient resolution. The design on grating theories for the rotation metric control of the latest indicator fails to improve its resolution, thus to prevent high-speed and precise scrolling.

4. Failing compact. Larger space consumed by the grating sensor device and its structure frustrates the application in the smaller indicator.

5. Higher production cost. Whereas the grating device dominates the primary control in the rotation metric control of the latest indicator, its assembly is comparatively complicated to increase the cost of the device, and the time and efforts needed for assembly.

SUMMARY OF THE INVENTION

The primary purpose of the present invention is to provide a magnetism metric controller to give higher precision and resolution while eliminating those defectives observed with the prior art by offering the following advantages:

Magnetic field sensor is used in the present invention to exit switch encoder or grating sensor. Magnetic filed generated by a permanent magnet is consistent and not easily interfered by external noise thus to yield consistent, reliable, and precise signal control advantage.

Signals from the magnetic field of the permanent magnet is used as the essential means for the rotation control in the present invention, sensitivity and resolution of those continuously changed signals retrieved can be set up and adjusted via a microprocessor.

The control in the present invention is achieved electronically free of interval with its control sensitivity adjustable as desired by the user to satisfy operation pattern of the individual user.

The permanent magnet and Hall sensor used in the present invention to achieve scrolling metric control permits simple design of the structure and significantly reduction of its size to facilitate its application in smaller indicators.

The present invention offers cheaper material cost and easier assembly for production cost reduction since the permanent magnet is used as a signal generator.

With those advantages described above, the present invention in conjunction with electronic process technology today is adaptable depending on the application to any information product requiring metric control.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
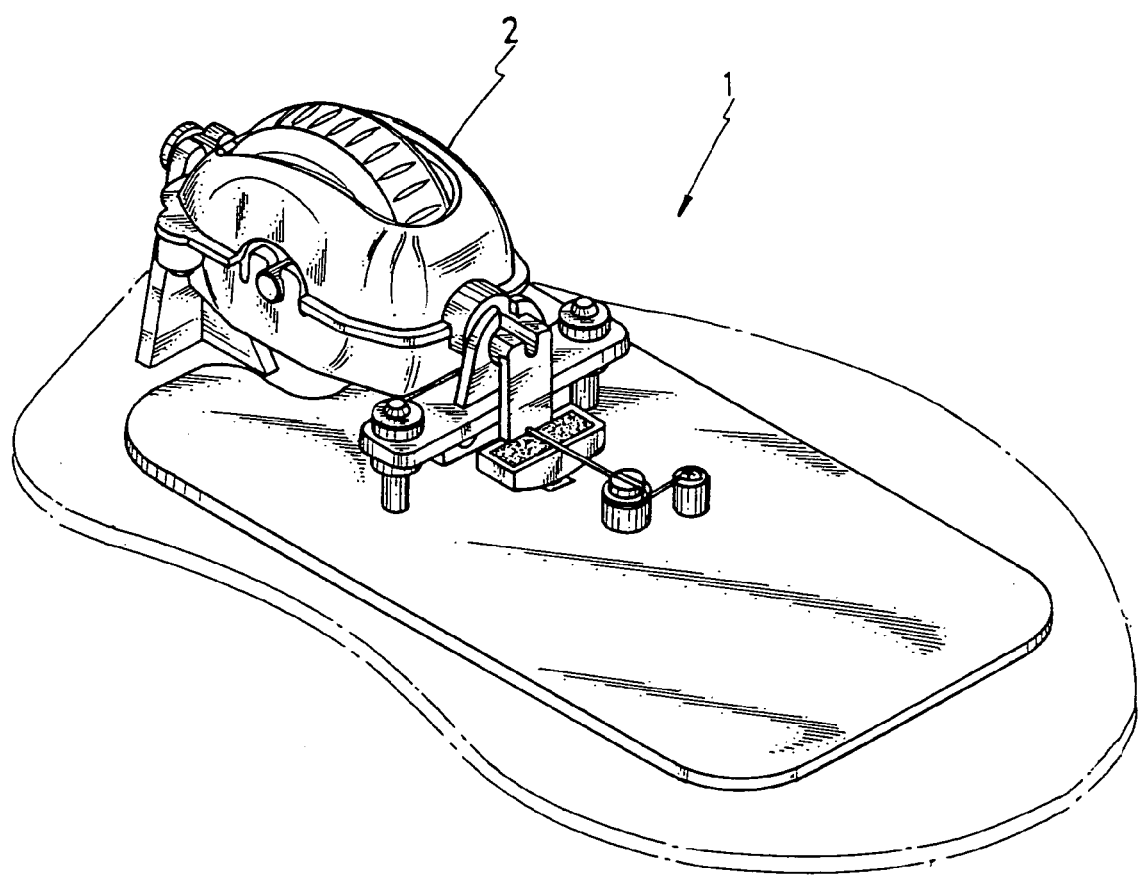
FIG. 1 is a perspective view of the present invention.
Figure 2:
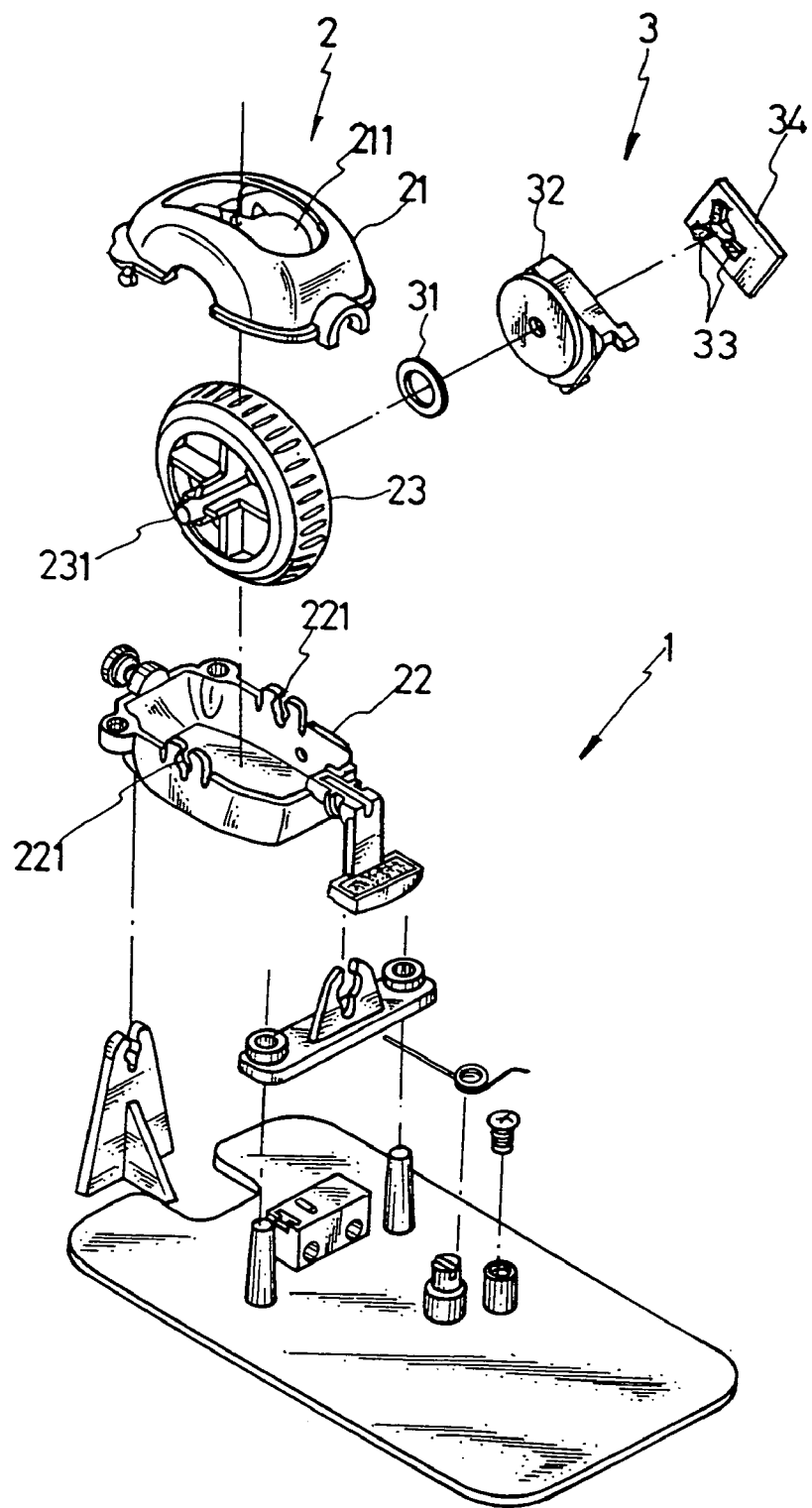
FIG. 2 is an exploded view of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims. Referring to FIG. 1, the present invention is essentially comprised of a scrolling wheel mechanism (2); therefore, there is no need to put any limitation on the target object of its application. As illustrated in FIG. 2, the present invention is essentially comprised of the scrolling wheel mechanism (2) and a signal retrieval installation (3). The scrolling wheel mechanism (2) includes (21), a pivot holder (22), and a scrolling wheel (23); and the signal retrieval installation disposed at where closer to one side of the scrolling wheel mechanism (2) includes a permanent magnet (31), a locking base (32), a Hall sensor (33) and a circuit board (34).

Figure 3:
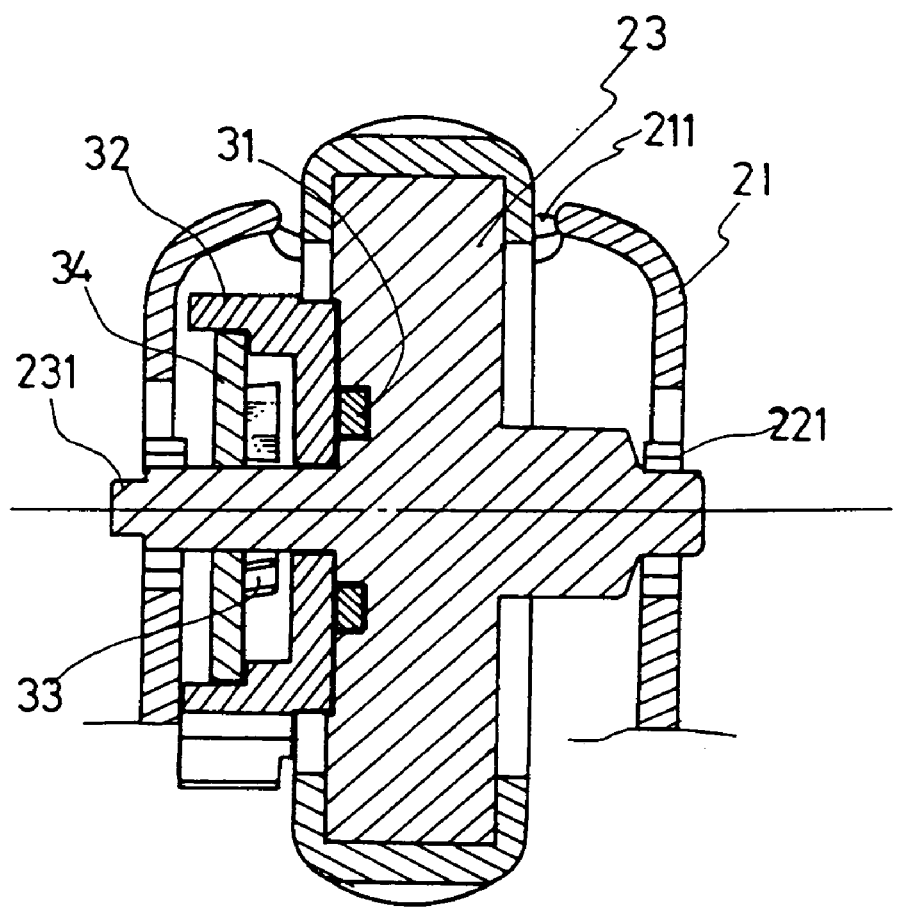
FIG. 3 is a sectional view of the present invention.

Also referring to FIG. 3, the scrolling wheel (23) in the scrolling wheel mechanism (2) is pivoted to both slots (221) provided on both sides of the pivot holder (22) with a shaft (231) extending sideway from the scrolling wheel (23) to permit the scrolling wheel (23) to freely rotate in the pivot holder (22). The cover (21) closes up from top and is engaged with the pivot holder (22) to become an integrated part so to cover up the scrolling wheel (23) in a space defined by and between the cover (21) and the pivot holder (22)

while exposing an opening (211) disposed on the surface of the cover (21) to facilitate rotation and dialing by the user.

The permanent magnet (31) is secured in and synchronously rotates with the scrolling wheel (23). The circuit board (34) is provided on the inner side of the locking base (32), and the locking base (32) is locked to the pivot holder (22). The Hall sensor (33) is disposed on the circuit board (34) at where in relation to the locations of the magnetic poles of the permanent magnet (31) to retrieve signals of changed magnetic filed generated as the permanent magnet (31) rotates.

Figure 4:
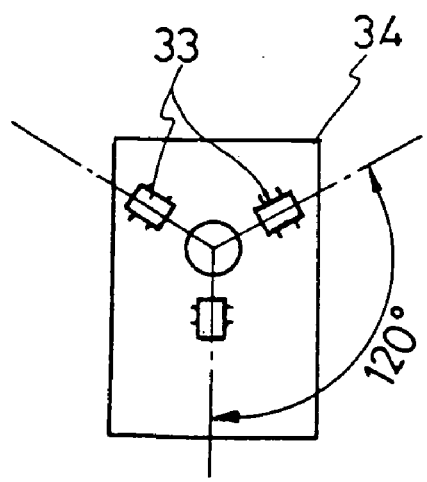
FIG. 4 is a schematic view showing arrangement of Hall sensor in the present invention.
Figure 5:
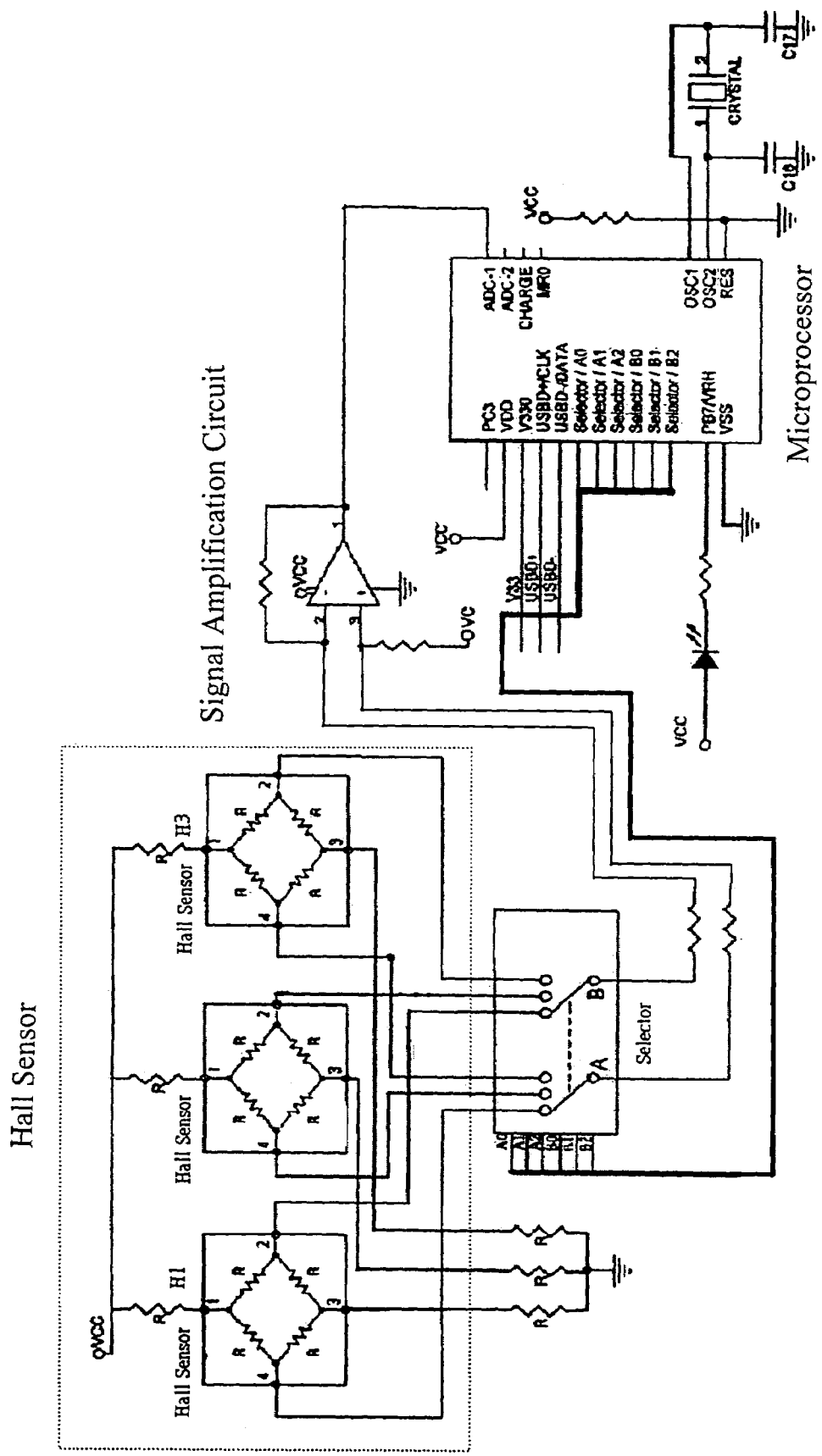
FIG. 5 is a circuit drawing of a device to retrieve signals from magnetic field in the present invention.

As illustrated in FIGS. 4 and 5, three Hall sensors (33) disposed 120-degree apart from one another in a circle, and respectively retrieve with a selector those signals of changed magnetic filed generated as the permanent magnet (31) rotates. Signals are then converted through an amplification circuit and a signal process unit in the microprocessor into digital data; in turn, operation programs of the microprocessor solve the rotation direction and displacement vectors of the scrolling wheel (23).

The permanent magnet and the Hall sensor constitute the design for the generation and retrieval of signals from the magnetic field. The number of the Hall sensor required solely depends on the design requirements. In the present invention, three Hall sensors are used. Signals so retrieved are process to solve the rotation vector of the scrolling wheel with the working principle and method described as follows.

Figure 6:
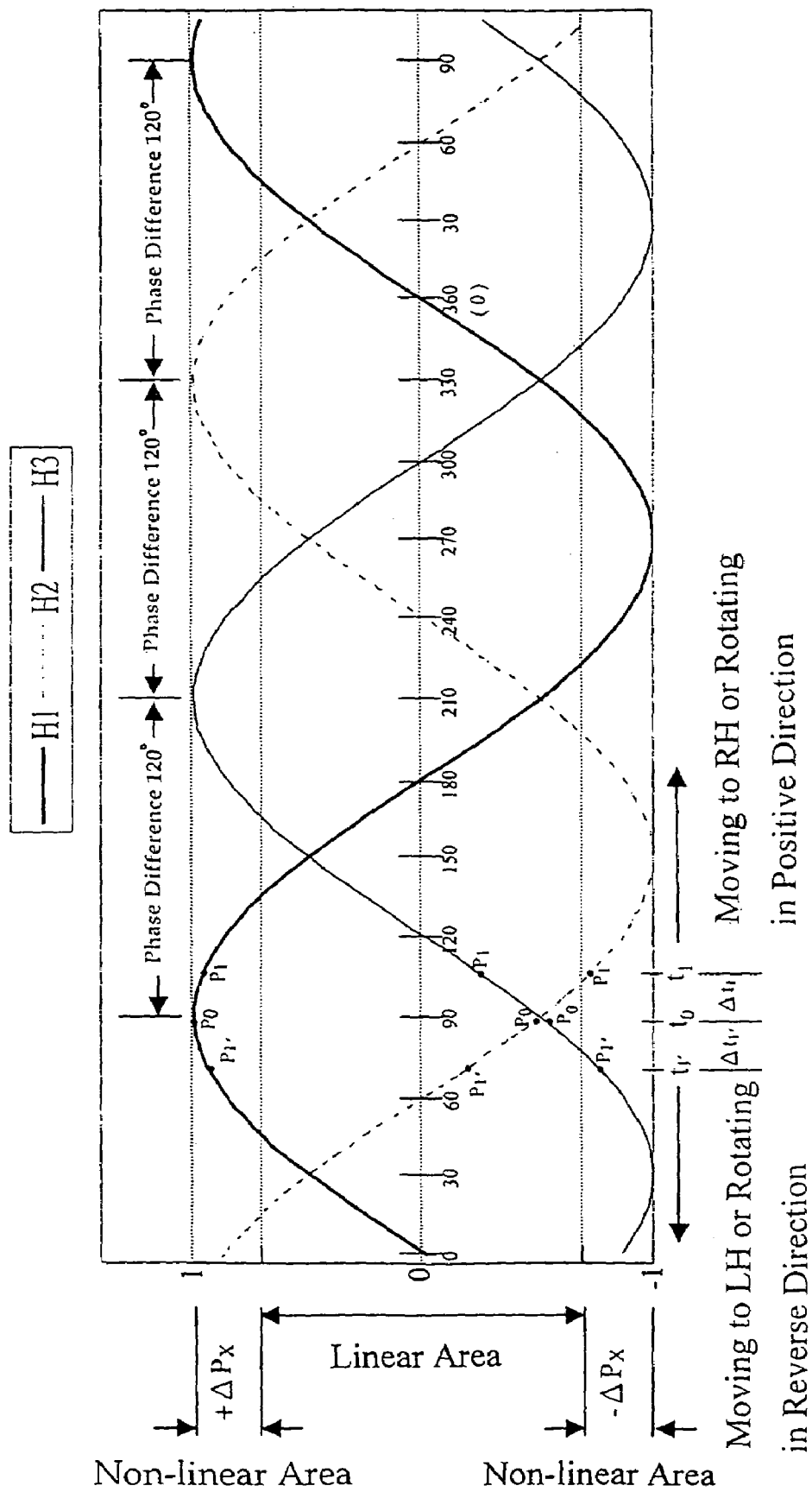
FIG. 6 is a schematic view showing waveforms of the signals retrieved by Hall sensor in the present invention.

Once the scrolling wheel (23) in the scrolling wheel mechanism (2) rotates due to external force applied, the permanent magnet (31) fixed in the scrolling wheel (23) rotates synchronously to generate signals of changed magnetic field. Three Hall sensors (33) retrieve those signals in waveforms as illustrated in FIG. 6. Wherein, H1, H2, and H3 represent waveforms of signals respectively retrieved by three Hall sensors. Given with 120-degree of phase difference between any two abutted waveforms is 120-degree; and t1', t0 and t1 respectively representing sampling times, the rotation vector of the scrolling wheel is solved as follows:

1. If $\Delta t1$ relates to the time lapse between t0 and t1; and $\Delta t1'$, between t1' and t0; signals sampled by three Hall sensors respectively at t0 are $H_1(P_{r0})$, $H_2(P_{r0})$, and $H_3(P_{r0})$; at t1, $H_1(P_{r1})$, $H_2(P_{r1})$, and $H_3(P_{r1})$; and at t1', $H_1(P_{r1'})$, $H_2(P_{r1'})$, and $H_3(P_{r1'})$.

2. If $\Delta P = P_{r0} - P_{r1}$, the sampling differences within $\Delta t1$ are respectively $\Delta P_{(H1)} = H_1(P_{r0}) - H_1(P_{r1})$, $\Delta P_{(H2)} = H_2(P_{r0}) - H_2(P_{r1})$, and $\Delta P_{(H3)} = H_3(P_{r0}) - H_3(P_{r1})$.

3. If $\Delta P' = P_{r0} - P_{r1'}$, the sampling differences within $\Delta t1'$ are respectively $\Delta P'_{(H1)} = H_1(P_{r1'}) - H_1(P_{r0})$, $\Delta P'_{(H2)} = H_2(P_{r1'}) - H_2(P_{r0})$, and $\Delta P'_{(H3)} = H_3(P_{r1'}) - H_3(P_{r1})$.

4. Assuming function $\Delta Min(H_x) = min(\Delta P_{(H1)}, \Delta P_{(H2)}, \Delta P_{(H3)})$; or $\Delta Min(H_x) = min(\Delta P'_{(H1)}, \Delta P'_{(H2)}, \Delta P'_{(H3)})$; wherein, $x = (1, 2, 3)$; then $\Delta Min(H_x)$ is the least signal difference of the signals continuously sampled by all three Hall sensors (the signal with the worst linearity) and though not qualified as the sampling signal for displacement it may be used as a condition in judging the direction of rotation.

5. Assuming function $\Delta Max(H_x) = max(\Delta P_{(H1)}, \Delta P_{(H2)}, \Delta P_{(H3)})$; or $\Delta Max(H_x) = max(\Delta P'_{(H1)}, \Delta P'_{(H2)}, \Delta P'_{(H3)})$; wherein, $x = (1, 2, 3)$; then $\Delta Max(H_x)$ is the greatest signal difference of the signals continuously sampled by all three Hall sensors (the signal with the best linearity) to serve as the displacement signal of rotation vector.

6. As illustrated in FIG. 6, $\Delta Min(H_x) = \Delta P_{(H1)}$ represents that $\Delta P_{(H1)}$ is the sampling signal difference with the worst linearity thus may be used as a condition in judging the direction of rotation; while $\Delta Max(H_x) = \Delta P_{(H2)}$ represents that $\Delta P_{(H2)}$ is the sampling signal difference with the best linearity to serve the displacement signal of the rotation vector. Therefore, if $\Delta P_{(H2)} > 0$, indicating $H_2(P_{r0}) > H_2(P_{r1})$, the scrolling wheel is moving to its right or rotating in positive direction; on the other hand, if $\Delta P_{(H2)} < 0$, indicating $H_2(P_{r0}) < H_2(P_{r1})$, the scrolling wheel is moving to its left or rotating in reverse direction.

Accordingly, as referred from Steps 1~6, the direction and displacement of the rotation vector of the scrolling wheel can be solved in any sampling interval.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A magnetism metric controller comprising: a scrolling wheel mechanism and a signal retrieval installation; the signal retrieval installation being provided inside the scrolling wheel mechanism; the scrolling wheel mechanism including a cover, a pivot holder and a scrolling wheel; the signal retrieval installation including a permanent magnet, a locking base, a Hall sensor, and a circuit board; a shaft extending sideway from the scrolling wheel mechanism; the scrolling wheel being pivoted to two pivoting slots disposed on both sides of the pivot holder via the shaft; the top of the scrolling wheel being closed up with the cover; a circumference of the scrolling wheel being exposed out of an opening disposed on the surface of the cover; the permanent magnet being secured to the scrolling wheel; the circuit board being accommodated in the locking base; the locking base being secured in the pivot holder; and the Hall sensor being provided on the circuit board at where in relation to the locations of the permanent magnet to retrieve signals of changed magnetic field generated as the permanent magnet rotates.

2. The magnetism metric controller of claim 1, wherein, multiple Hall sensors are used to retrieve signals from changed magnetic field.

* * * * *